US012621408B2

(12) United States Patent
Guo

(10) Patent No.: US 12,621,408 B2
(45) Date of Patent: May 5, 2026

(54) IMAGE PROCESSING METHOD AND APPARATUS, AND ELECTRONIC DEVICE, AND COMPUTER READABLE MEDIUM

(71) Applicant: Beijing Zitiao Network Technology Co., Ltd., Beijing (CN)

(72) Inventor: He Guo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 315 days.

(21) Appl. No.: 18/247,422

(22) PCT Filed: Sep. 17, 2021

(86) PCT No.: PCT/CN2021/118951
§ 371 (c)(1),
(2) Date: Mar. 30, 2023

(87) PCT Pub. No.: WO2022/068609
PCT Pub. Date: Apr. 7, 2022

(65) Prior Publication Data
US 2024/0007590 A1　　Jan. 4, 2024

(30) Foreign Application Priority Data
Sep. 30, 2020　　(CN) .......................... 202011065674.1

(51) Int. Cl.
*H04N 7/14*　　(2006.01)
*G06T 19/00*　　(2011.01)
(Continued)

(52) U.S. Cl.
CPC ........... *H04N 7/147* (2013.01); *G06T 19/006* (2013.01); *G06V 10/761* (2022.01); *H04N 7/157* (2013.01)

(58) Field of Classification Search
CPC .... H04N 7/147; H04N 7/157; H04N 21/4788; H04N 7/142; G06T 19/006;
(Continued)

(56) References Cited

U.S. PATENT DOCUMENTS

2016/0026253 A1　1/2016　Bradski et al.
2018/0040304 A1*　2/2018　Choi ...................... G09G 5/377
(Continued)

FOREIGN PATENT DOCUMENTS

CN　　101610421 A　12/2009
CN　　106165404 A　11/2016
(Continued)

OTHER PUBLICATIONS

China National Intellectual Property Administration, International Search Report Issued in Application No. PCT/ CN2021/118951, Dec. 7, 2021, WIPO, 4 pages.
(Continued)

*Primary Examiner* — Phung-Hoang J Nguyen
(74) *Attorney, Agent, or Firm* — Alleman Hall LLP

(57) ABSTRACT

A method for image processing is provided. The method includes: acquiring a first image from a first terminal and a second image from a second terminal, wherein the first image comprises a first portrait, and the second image comprises a second portrait; performing image matting on the second image to obtain the second portrait; and placing the second portrait in the first image through an augmented reality AR technology to obtain a third image, where the third image is displayed on the first terminal.

18 Claims, 10 Drawing Sheets

(51) Int. Cl.
　　 *G06V 10/74* 　　　(2022.01)
　　 *H04N 7/15* 　　　(2006.01)
(58) Field of Classification Search
　　 CPC ............ G06T 2207/20221; G06T 5/50; G06V
　　　　　　　　 10/761; G06V 20/20; G06V 20/64
　　 See application file for complete search history.

(56) References Cited

U.S. PATENT DOCUMENTS

| | | | | |
|---|---|---|---|---|
| 2019/0080498 | A1* | 3/2019 | Horie | ................... G06T 3/4053 |
| 2020/0360816 | A1* | 11/2020 | Cahill | ..................... A63F 13/65 |

FOREIGN PATENT DOCUMENTS

| | | |
|---|---|---|
| CN | 108259810 A | 7/2018 |
| CN | 108428375 A | 8/2018 |
| CN | 110139030 A | 8/2019 |
| CN | 110456957 A | 11/2019 |
| CN | 110580733 A | 12/2019 |
| CN | 110852310 A | 2/2020 |
| CN | 110866977 A | 3/2020 |
| CN | 111656406 A | 9/2020 |
| CN | 112423142 A | 2/2021 |

OTHER PUBLICATIONS

China National Intellectual Property Administration, Office Action and Search Report Issued in Application No. 202011065674.1 Apr. 8, 2022, 9 pages.
China National Intellectual Property Administration, Notification to Grant Patent Right for Invention Issued in Application No. 202011065674.1, Mar. 13, 2024, 8 pages.
Chen, Z., "Image Processing Technology Based on Computer Vision Algorithm," Electronic World, Issue 16, Aug. 30, 2020, 7 pages.

* cited by examiner

100

<u>100</u>

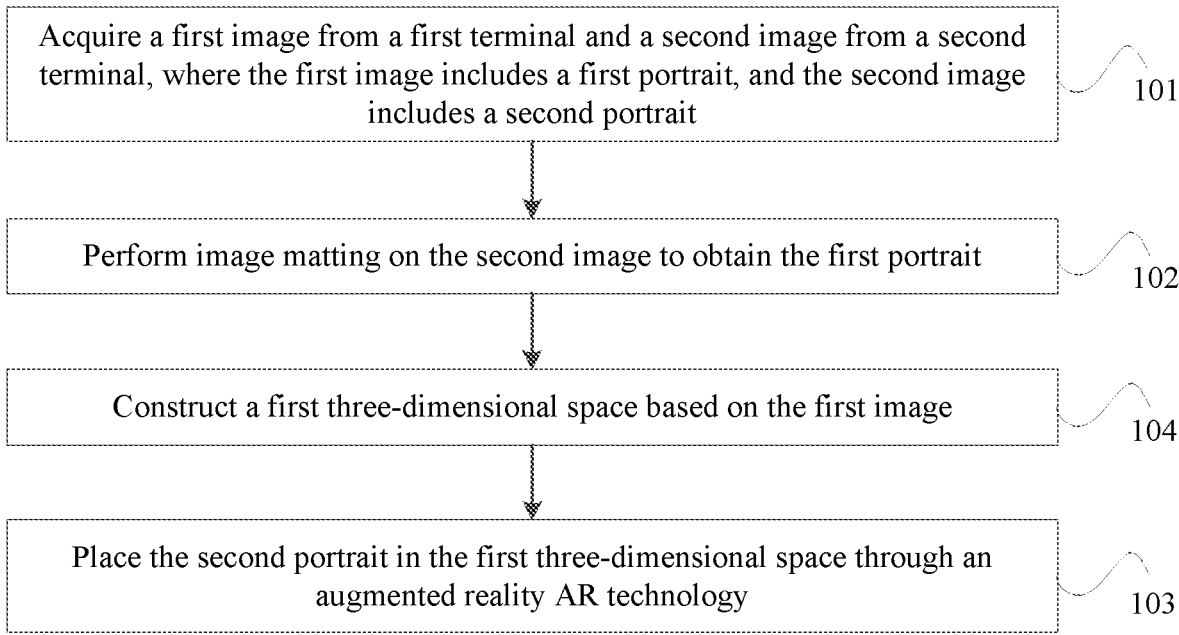

Acquire a first image from a first terminal and a second image from a second terminal, where the first image includes a first portrait, and the second image includes a second portrait    101

Perform image matting on the second image to obtain the first portrait    102

Construct a first three-dimensional space based on the first image    104

Place the second portrait in the first three-dimensional space through an augmented reality AR technology    103

Fig. 2

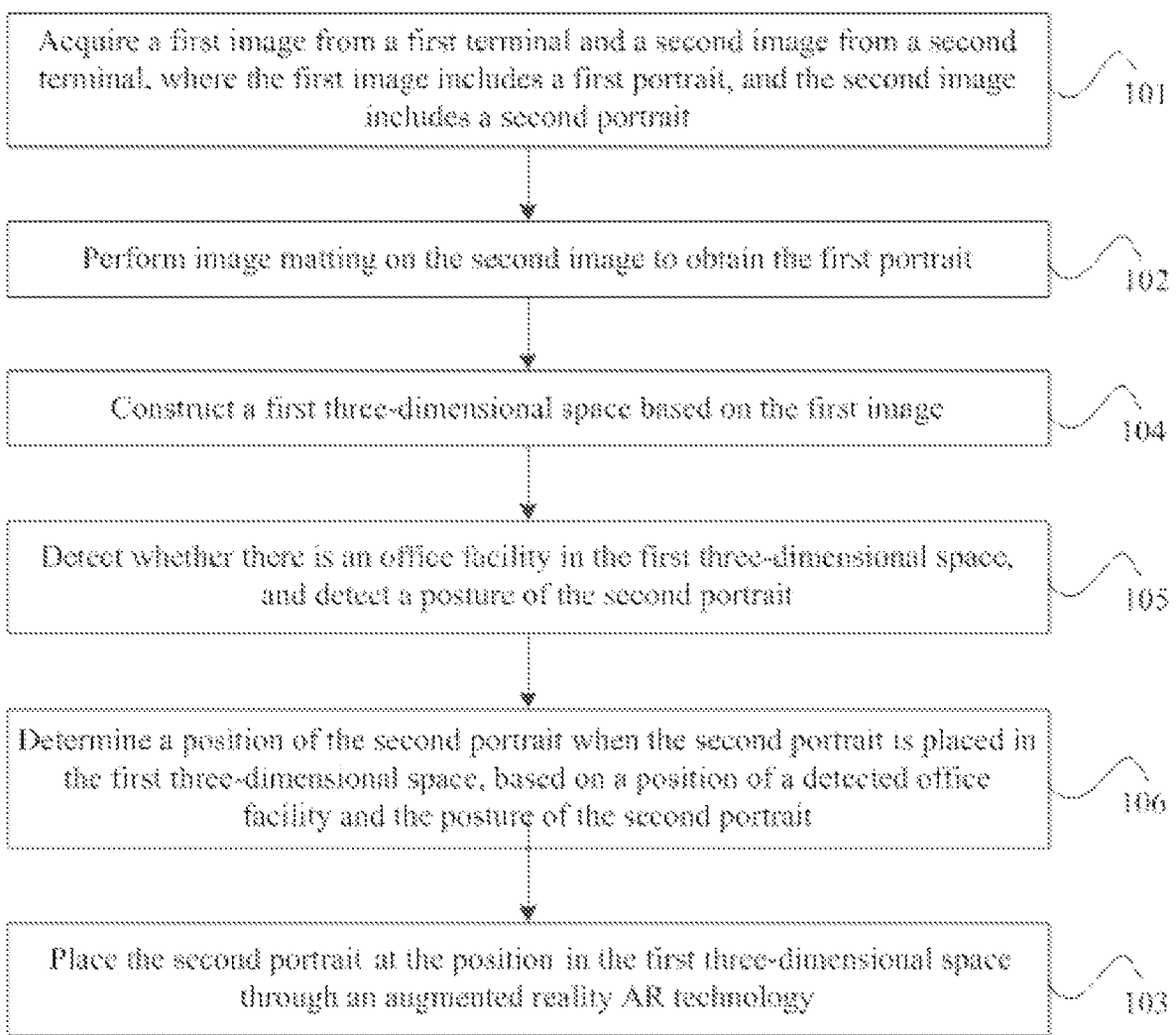

100

Acquire a first image from a first terminal and a second image from a second terminal, where the first image includes a first portrait, and the second image includes a second portrait — 101

Perform image matting on the second image to obtain the first portrait — 102

Construct a first three-dimensional space based on the first image — 104

Detect whether there is an office facility in the first three-dimensional space, and detect a posture of the second portrait — 105

Determine a position of the second portrait when the second portrait is placed in the first three-dimensional space, based on a position of a detected office facility and the posture of the second portrait — 106

Place the second portrait at the position in the first three-dimensional space through an augmented reality AR technology — 103

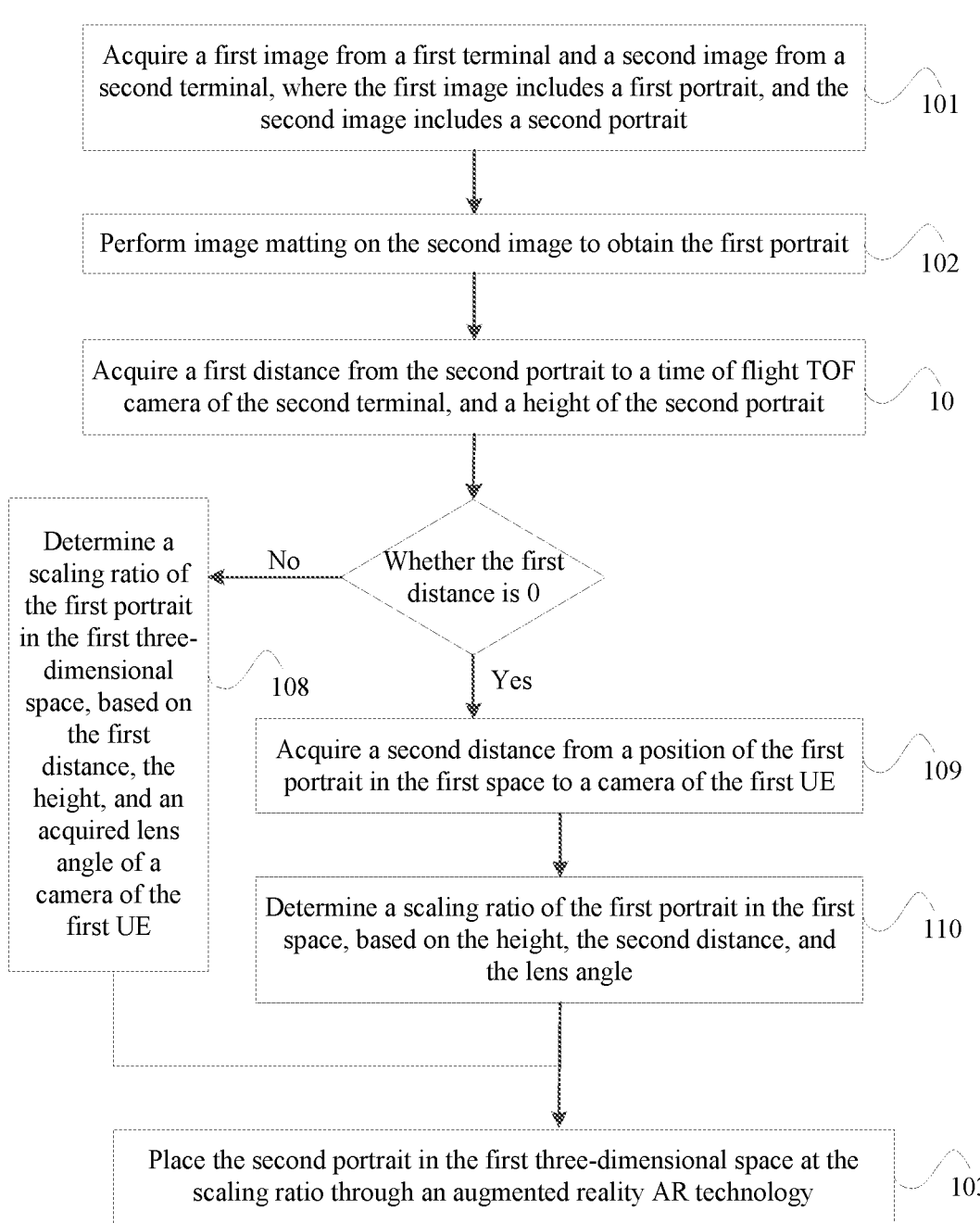

Acquire a first image from a first terminal and a second image from a second terminal, where the first image includes a first portrait, and the second image includes a second portrait

101

Perform image matting on the second image to obtain the first portrait

102

Acquire a first distance from the second portrait to a time of flight TOF camera of the second terminal, and a height of the second portrait

10

Determine a scaling ratio of the first portrait in the first three-dimensional space, based on the first distance, the height, and an acquired lens angle of a camera of the first UE Whether the first distance is 0

No

108

Yes

Acquire a second distance from a position of the first portrait in the first space to a camera of the first UE

109

Determine a scaling ratio of the first portrait in the first space, based on the height, the second distance, and the lens angle

110

Place the second portrait in the first three-dimensional space at the scaling ratio through an augmented reality AR technology

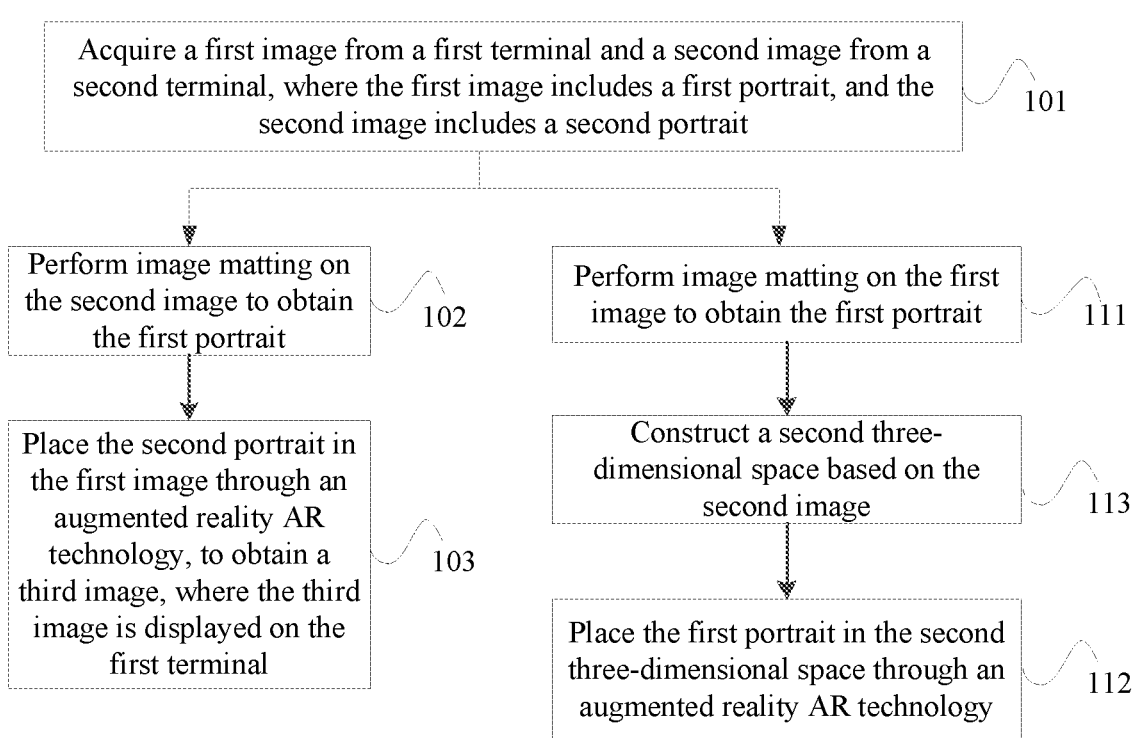

Acquire a first image from a first terminal and a second image from a second terminal, where the first image includes a first portrait, and the second image includes a second portrait — 101

Perform image matting on the second image to obtain the first portrait — 102

Perform image matting on the first image to obtain the first portrait — 111

Place the second portrait in the first image through an augmented reality AR technology, to obtain a third image, where the third image is displayed on the first terminal — 103

Construct a second three-dimensional space based on the second image — 113

Place the first portrait in the second three-dimensional space through an augmented reality AR technology — 112

Fig. 7

IMAGE PROCESSING METHOD AND APPARATUS, AND ELECTRONIC DEVICE, AND COMPUTER READABLE MEDIUM

CROSS-REFERENCE TO RELATED APPLICATIONS

This application is a National phase application of PCT international patent application PCT/CN2021/118951, filed on Sep. 17, 2021, which claims priority to Chinese Patent Application No. 202011065674.1, titled "IMAGE PROCESSING METHOD AND APPARATUS, AND ELECTRONIC DEVICE, AND COMPUTER READABLE MEDIUM", filed on Sep. 30, 2020 with the China National Intellectual Property Administration, both of which are incorporated herein by reference in their entireties.

FIELD

The present disclosure relates to the field of image processing, and in particular to a method and a apparatus for image processing, an electronic apparatus, and a computer-readable medium.

BACKGROUND

With the rapid development of Internet technology, remote interaction based on network technologies is widely used in more and more fields.

Conventional methods for remote interaction include voice remote interaction and traditional video remote interaction. The voice remote interaction can only realize communication of voices without image transmission, which is not visual or intuitive. Compared with the voice remote interaction, the traditional video remote interaction enables real-time transmission of images, achieving a great breakthrough in terms of visibility. However, the traditional video remote interaction is merely a simple video call, which cannot meet a user demand for a realistic face-to-face interaction, resulting in poor user experience.

SUMMARY

The summary is provided to introduce concepts in a simplified form, which are described in detail in the following detailed description. The summary is not intended to identify key features or essential features of the claimed technical solution, nor is it intended to limit the scope of the claimed technical solution.

In a first aspect of the present disclosure, a method for image processing is provided. The method includes: acquiring a first image from a first terminal and a second image from a second terminal, where the first image includes a first portrait, and the second image includes a second portrait; performing image matting on the second image to obtain the second portrait; and placing the second portrait in the first image through an augmented reality AR technology to obtain a third image, where the third image is displayed on the first terminal.

In a second aspect of the present disclosure, a apparatus for image processing is provided. The device includes: an acquisition module, configured to acquire a first image from a first terminal and a second image from a second terminal, where the first image includes a first portrait, and the second image includes a second portrait; a processing module, configured to perform image matting on the second image to obtain the second portrait; and a placement module, configured to place the second portrait in the first image through an augmented reality AR technology to obtain a third image, where the third image is displayed on the first terminal.

In a third aspect of the present disclosure, an electronic apparatus is provided. The electronic apparatus includes: a processor; and a memory configured to store machine-readable instructions. The instructions, when executed by the processor, cause the processor to implement the method for image processing according to the first aspect of the present disclosure.

In a fourth aspect of the present disclosure, a computer-readable medium is provided. The computer-readable medium stores a computer program. The computer program, when executed by a processor, implements the method for image processing according to the first aspect of the present disclosure.

Beneficial effects of the technical solutions provided in the embodiments of the present disclosure include at least the following aspects.

A method and a apparatus for image processing, an electronic apparatus, and a medium are provided in the present disclosure, with which a portrait obtained by image matting on an image is placed onto another image including a portrait through an augmented reality AR technology to obtain a new image, and the image is displayed on a terminal. Thereby, a user demand for a realistic face-to-face interaction is satisfied, and user experience is improved.

BRIEF DESCRIPTION OF THE DRAWINGS

The above and other features, advantages and aspects of various embodiments of the present disclosure will become clearer when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

FIG. 2 is a schematic flowchart of a method for image processing according to another exemplary embodiment of the present disclosure.

FIG. 3 is a schematic flowchart of a method for image processing according to yet another exemplary embodiment of the present disclosure.

FIG. 5 is a schematic flowchart of a method for image processing according to yet another exemplary embodiment of the present disclosure.

FIG. 7 is a schematic flowchart of a method for image processing according to another exemplary embodiment of the present disclosure.

DETAILED DESCRIPTION

Figure 1:
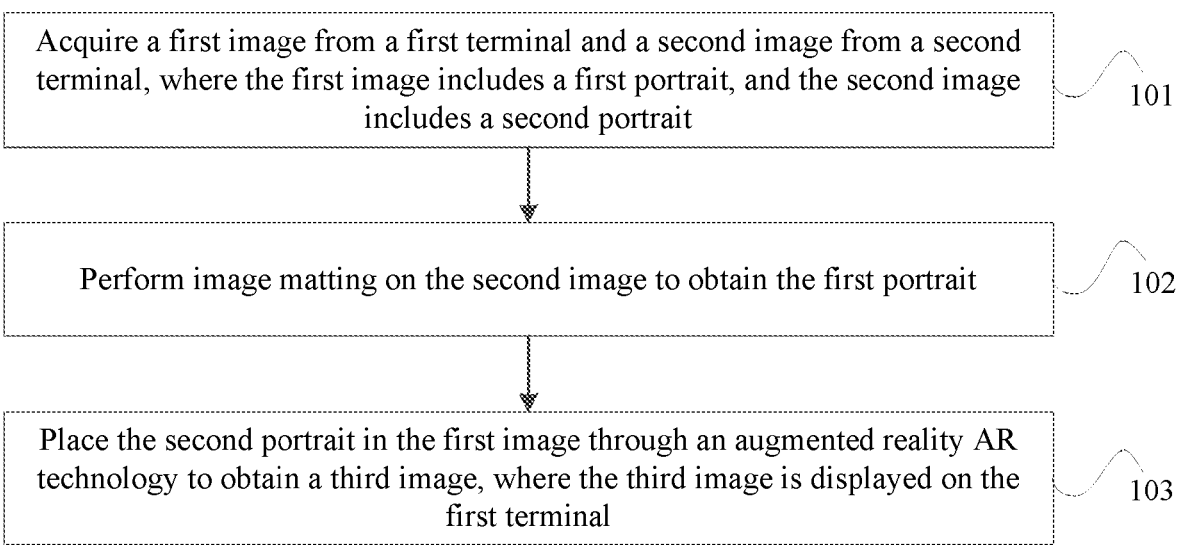
FIG. 1 is a schematic flowchart of a method for image processing according to an exemplary embodiment of the present disclosure.

Embodiments of the present disclosure are described in more detail below with reference to the accompanying drawings. Although certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are provided as examples only, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

The technical solution of the present disclosure and the technical solution of the present disclosure are described in detail below with specific embodiments. If the above technical documents are solved, the following specific embodiments can be combined with each other. The same or similar concepts or processes may not be described in some embodiments.

The embodiments of the present disclosure are described below in combination with the drawings.

FIG. 1 is a method 100 for image processing according to an exemplary embodiment of the present disclosure. The method includes 101 to 103.

In 101, a first image from the first terminal and a second image from the second terminal are acquired, where the first image includes a first portrait and the second image includes a second portrait.

In 102, image matting is performed on the second image to obtain the second portrait.

In 103, the second portrait I placed in the first image through an augmented reality AR technology to obtain a third image, where the third image is displayed on the first terminal.

Specifically in this embodiment, for images from different terminals and each containing a portrait, imaging matting may be applied to obtain a portrait of one of the images. The portrait obtained by image matting is placed in another one of the images to obtain a new image. The new image is displayed on one of the terminals. Thereby, a user demand for a realistic face-to-face interaction is satisfied, and user experience is improved.

Reference is made to FIG. 2. In an embodiment, the method 100 further includes 104 after step 101.

In 104. a first three-dimensional space is constructed based on the first image.

In this case, the 103 specifically includes: placing the second portrait in the first three-dimensional space through the augmented reality AR technology.

Specifically in this embodiment, step 104 may be implemented by using a simultaneous localization and mapping SLAM algorithm. That is, in step 104, the first three-dimensional space is constructed by processing the first image by using the simultaneous localization and mapping SLAM algorithm. A specific process of constructing a spatial map using the SLAM algorithm is well-known for those skilled in the art, and is not repeated here.

In this embodiment, a terminal performs image matting on the second image from the second terminal to obtain the second portrait, and place the second portrait in the first three-dimensional space constructed by the terminal through the augmented reality AR technology. Hence, a holder of the first terminal can have virtual face-to-face communication with a first user corresponding to the second portrait.

The 5G technology provides an end-to-end communication with low delay. The real-time communication RTC technology may be used in an embodiment, so as to support transmission of multimedia data. The AR technology supports construction of virtual characters, making it possible to carry out virtual face-to-face communication. Therefore, in the embodiments of the present disclosure, a combination of these three technologies is used to achieve virtual face-to-face communication, which is revolutionary over the conventional online communication mode, makes online communication more realistic, and improves user experience.

It should be noted that in this embodiment, due to adoption of RTC technology, the terminal may receive an image forwarded through RTC in real time, perform image matting on the image to obtain a portrait, and place the portrait in a constructed space. Therefore, with the method in the embodiment of the present disclosure, two uses can experience an immersive face-to-face interaction.

Reference is made to FIG. 3. In an embodiment, the method 100 may further include 105 and 106 before step 103.

In 105, it is detected whether there is an office facility in the first three-dimensional space, and a posture of the second portrait is detected.

In 106, a position of the second portrait when the second portrait is placed in the first three-dimensional space is determined based on a position of a detected office facility and the posture of the second portrait.

The step 103 specifically includes: placing the second portrait at the position in the first three-dimensional space through the augmented reality AR technology.

That is, in an embodiment, the position of the portrait to be placed in the space may be determined based on: the office facility in the space, such as a desk, and a chair; and the posture of the portrait, such as a standing posture, and a sitting posture.

For example, on detecting that there is a desk in the space and the portrait is of a standing posture, the portrait may be placed next to the desk when placed in the space; or on detecting that a holder of the first terminal is on a side of the desk, the portrait may be placed on another side of the desk opposite to the holder, so that the holder of the first terminal can have a virtual face-to-face communication with the user corresponding to the portrait.

In another example, on detecting that there is a chair (or additionally with a table) in the space and the portrait is of a sitting posture, the portrait may be placed on the chair.

In this embodiment, the position of the portrait when the portrait is placed in the space is determined by detecting whether there is an office facility in the space and detecting the posture of the portrait. Thereby, the virtual face-to-face communication is more realistic.

Figure 4:
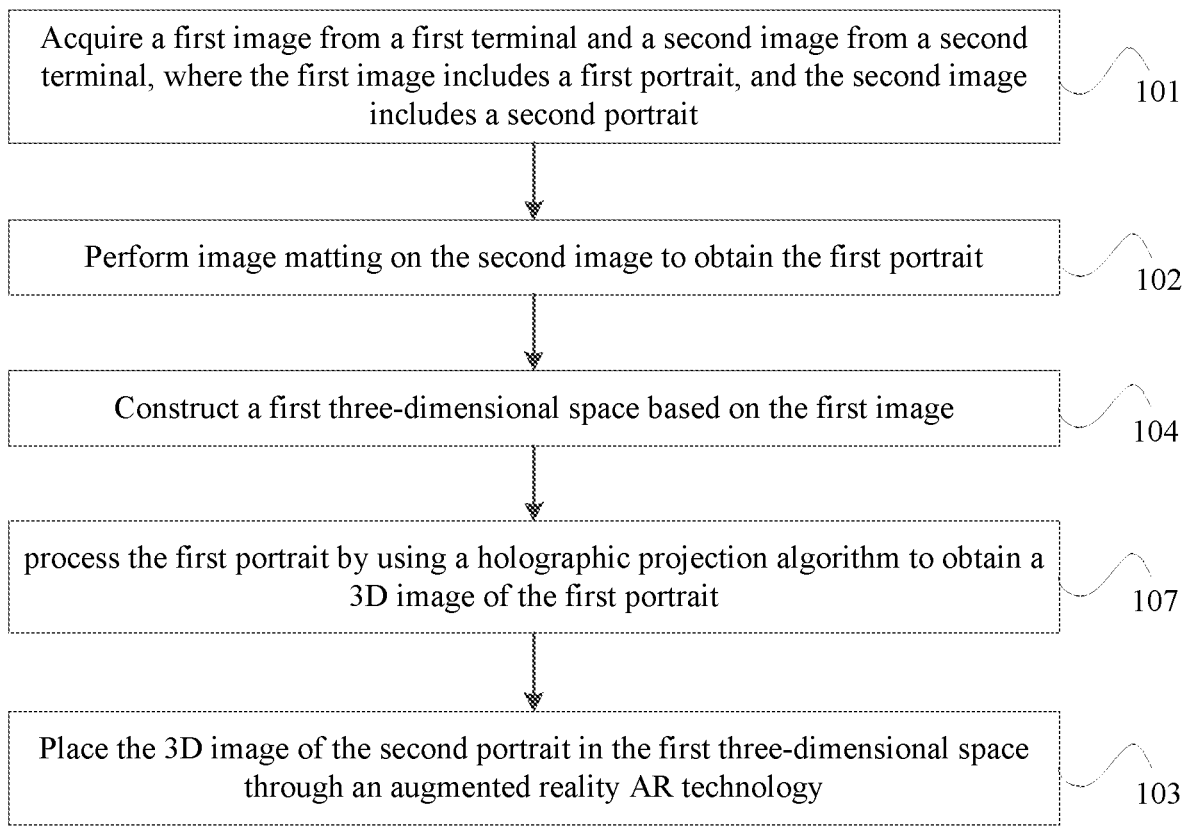
FIG. 4 is a schematic flowchart of a method for image processing according to a further exemplary embodiment of the present disclosure.

Reference is made to FIG. 4. In an embodiment, the method 100 further includes 107 before step 103.

In 107, the second portrait is processed by using a holographic projection algorithm to obtain a 3D image of the second portrait.

The step 103 specifically includes: placing the 3D image of the second portrait in the first three-dimensional space through the augmented reality AR technology.

That is, in this embodiment, the 3D image of the portrait may be obtained by using the holographic projection algorithm, and then the 3D image of the portrait may be placed in the constructed space. Thereby, an immersive realistic face-to-face interaction can be realized.

It should be noted that steps 105 and 106 in the previous embodiment may be included based on this embodiment. In this case, step 103 specifically includes: placing the 3D image of the second portrait at the position in the first three-dimensional space through the augmented reality AR technology.

That is, in this embodiment, when placing the 3D image of the portrait in the constructed space, the 3D image of the portrait may be placed at the position determined based on the office facility in the space and the posture of the portrait.

For example, on detecting that there is a desk in the space and the portrait is of a standing posture, the 3D image of the portrait may be placed next to the desk in the space; or on detecting that a holder of the first terminal is next to a side of the desk, the 3D image of the portrait may be placed on another side of the desk opposite to the holder, so that the holder of the first terminal can have a virtual face-to-face communication with the user corresponding to the portrait.

In another example, on detecting that there is a chair (or additionally with a table) in the space and the portrait is of a sitting posture, the 3D image of the portrait may be placed on the chair.

Reference is made to FIG. 5. In some embodiments, the method 100 further includes steps 10, 108, 109, and 110 before step 103.

In 10, a first distance from the second portrait to a time of flight TOF camera of the second terminal, and a height of the second portrait are determined.

In 108, a scaling ratio of the second portrait in the first three-dimensional space is determined in a case that the first distance is not 0, based on the first distance, the height information, and a lens angle of a camera of the first terminal.

In an embodiment, the first distance is not 0, which indicates that the second terminal contains a TOF camera. Therefore, the distance dist_a from the second portrait to the camera, and the lens angle FOV, $\theta\_a$, may be obtained. Thereby, the height of the second portrait is calculated by height_a=tan($\theta\_a/2$)*dist_a.

The second portrait may be placed at a position having a distance dist_a from the camera of the first terminal, and the scaling ratio $\lambda$ of the second portrait is calculated by:

$$\lambda=\tan(\theta\_b/2)*\text{dist}\_a/\text{height}\_a,$$

where $\theta\_b$ represents the lens angle of the first terminal, and there has height_a=tan($\theta\_a/2$)*dist_a.

In 109, a second distance from the position of the second portrait in the first three-dimensional space to the camera of the first terminal is determined in a case that the first distance is 0.

In an embodiment, the first distance is 0, which indicates that the second terminal does not contain a TOF camera. Therefore, there has height_a=180 cm and dist_a=0 by default.

In 110, the scaling ratio of the second portrait in the first three-dimensional space is determined based on the height, the second distance the lens angle.

In an embodiment, in a case that the second portrait cannot be placed at a position having a distance dist_a from the camera of the first terminal, a distance dist b from a position of the second portrait in an SLAM space where the holder of the first terminal is located to the camera of the first terminal is acquired. Then the scaling ratio $\lambda$ of the second portrait is calculated by:

$$\lambda=\tan(\theta\_b/2)*\text{dist}\_b/\text{height}\_a,$$

where $\theta\_B$ represents the lens angle of the first terminal, and there has height_a=180 cm.

In this case, step 103 specifically includes: placing the second portrait in the first three-dimensional space at the scaling ratio through the augmented reality AR technology.

That is, in such embodiment, a relationship between placement distance and a portrait dimension needs to be considered when placing a portrait in the SLAM space, so as to make the virtual face-to-face communication more realistic.

It should be noted that step 107 in previous embodiment may be included based on this embodiment. In this case, step 103 specifically includes: placing the 3D image of the second portrait in the first three-dimensional space at the scaling ratio through the augmented reality AR technology.

That is, when placing the 3D image of the portrait in the constructed space, the 3D image of the portrait may be placed at a determined scaling ratio.

In an example, in a case that the second image is acquired through a TOF camera of the second terminal, a process of acquiring the height of the second portrait includes: determining the height based on the first distance and an acquired lens angle of the TOF camera of the second terminal.

For example, the height of the second portrait is calculated by height_a=tan($\theta\_a/2$)*dist_a.

In another embodiment, in a case that the second image is acquired through a camera other than the TOF camera of the second terminal, the first distance is 0, and the height is equal to a preset value.

That is, in order to ensure that the second portrait, after placed in the constructed first three-dimensional space, can have a face-to-face communication with the holder of the first terminal, the second terminal needs to transmit the height of the portrait, the distance from the portrait and the camera, together with the second image synchronously to the first terminal.

Figure 6:
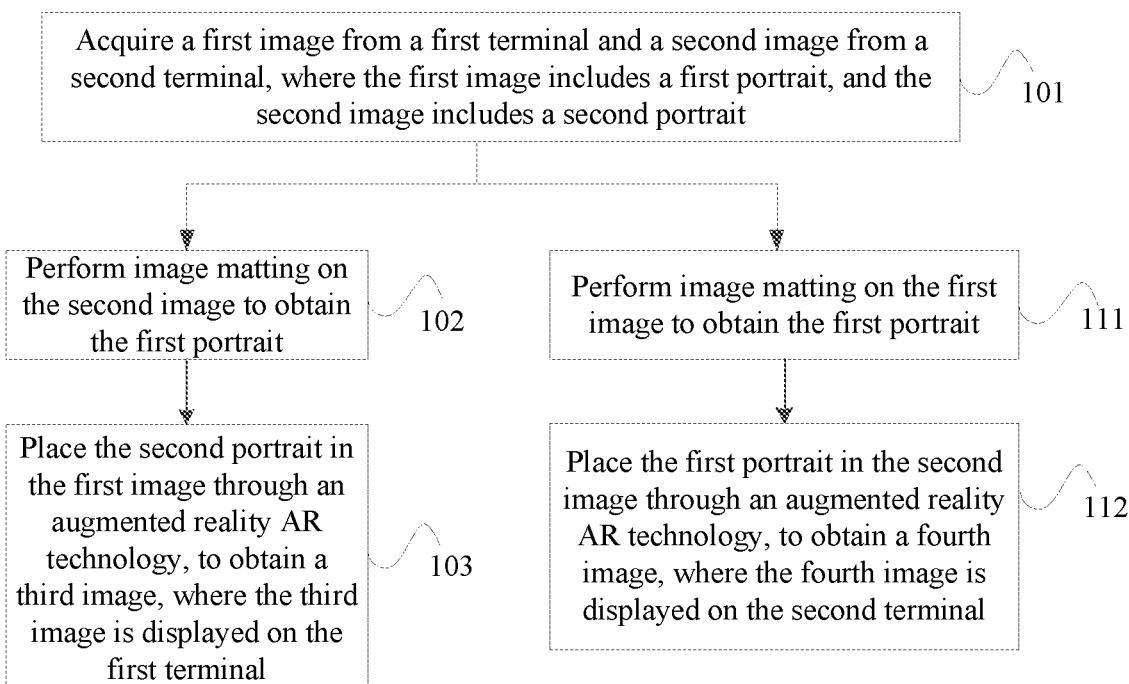
FIG. 6 is a schematic flowchart of a method for image processing according to an exemplary embodiment of the present disclosure.

Reference is made to FIG. 6. In an embodiment, the method 100 further includes 111 and 112.

In 111, image matting is performed on the first image to obtain the first portrait.

In 112, the first portrait is placed in the second image through the augmented reality AR technology to obtain a fourth image, where the fourth image is displayed on the second terminal.

That is, during the image processing, for images from different terminals and each containing a portrait, imaging matting may be applied to obtain a first portrait of one of the images. The first portrait obtained by image matting is placed in another one of the images to obtain a new first image. The new image is displayed on one of the terminals. Meanwhile, image matting may be performed on another one of the images to obtain a second portrait. The second portrait may be placed in an image to obtain a new second image. The new image is displayed on another terminal. Hence, user demands of both parties for a realistic face-to-face interaction are satisfied, and user experience is improved.

Reference is made to FIG. 7. In an embodiment, the method 100 further includes step 113 after step 101.

In 113, a second three-dimensional space is constructed based on the second image.

In such case, step 112 may specifically include: placing the first portrait in the second three-dimensional space through the augmented reality AR technology.

It should be understood that in this embodiment, the process of constructing the second three-dimensional space based on the second image is similar to the process of constructing the first three-dimensional space based on the first image, and is not described in detail here for the sake of brevity.

A specific implementation of step 112 is similar to the specific implementations of step 103 in the above embodiments, and is not described in detail here for the sake of brevity.

It should be noted that in the above embodiments, an execution subject of method 100 may be either a server or a terminal, which is not limited here. In a case that the execution subject of method 100 is a terminal, the first terminal may serve as a receiving end. In some embodiments, the first terminal may serve as both a sending end and a receiving end.

It should also be noted that in an embodiment, the first image may be acquired by the first terminal using its own image acquisition device, or may be acquired by receiving an image acquired by and transmitted from an external image acquisition device. Similarly, the second image may be acquired by the second terminal using its own image acquisition device, or may be acquired by receiving an image acquired by and transmitted from an external image acquisition device. In a case that the execution subject of the method 100 is a server, step 101 may specifically include: receiving one or both of a first image and a second image forwarded by a real-time communication server. In a case that the execution subject of method 100 is the terminal, assuming it is the first terminal, then the first image is acquired by the first terminal using its own image acquisition device, and the second image is forwarded from the real-time communication server. The second image may be acquired by the first terminal using its own image acquisition device, or may be acquired by receiving an image acquired by and transmitted from an external image acquisition device.

Figure 8:
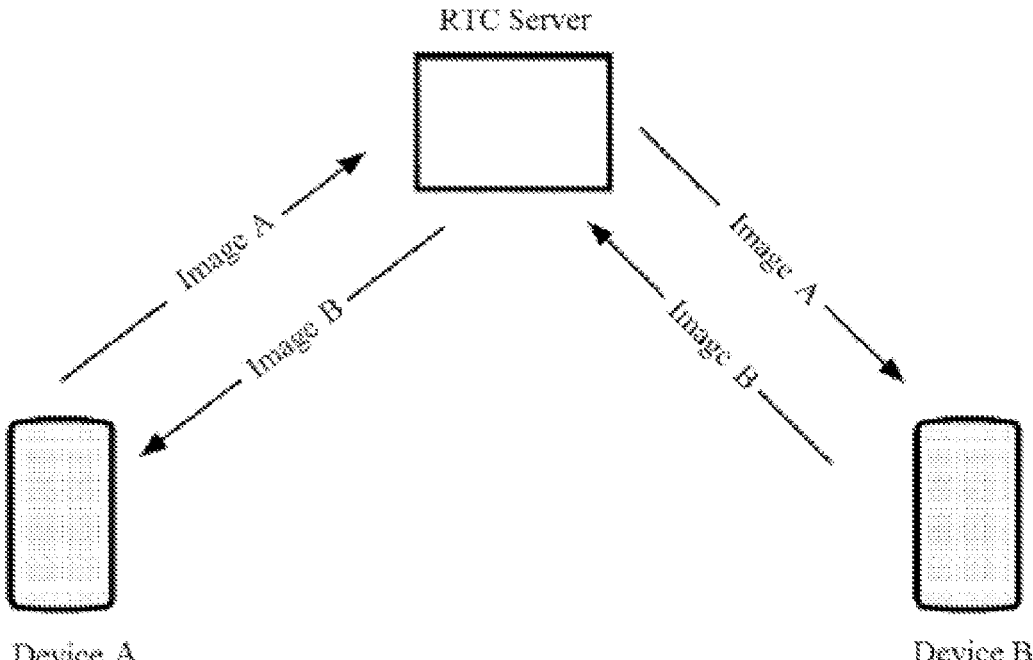
FIG. 8 is a data transmission diagram of a method for image processing according to an exemplary embodiment of the present disclosure.

Reference is made to FIG. 8. The first terminal is device B. On reception of image A forwarded from the RTC server, device B may send image B acquired by itself to the RTC server, so that image B is forwarded to device A. The second terminal is device A as shown in FIG. 8. Device A may receive image B forwarded form the RTC server while sending image A acquired by itself to the RTC server for forwarding image A to device B through the RTC server.

It should be noted that, step 104, or steps 105 and 106, or step 107, or steps 10, and 108 to 110 may be included in embodiments. An execution order of the steps is not chronological or according to serial numbers thereof, but is determined based on internal logical relationships among the steps.

Figure 9:
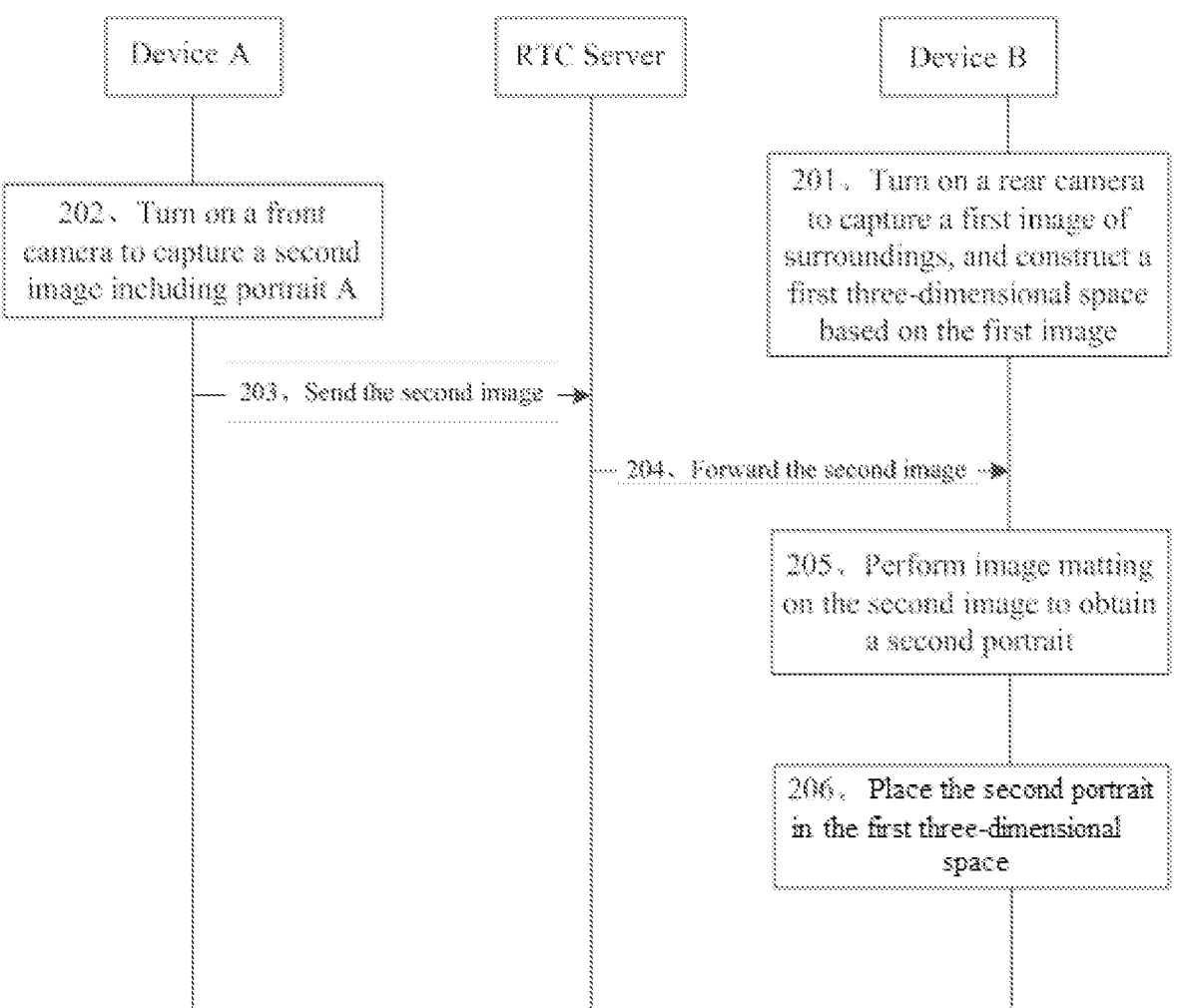
FIG. 9 is a schematic flowchart of an interactive process of a method for image processing according to an embodiment of the present disclosure.

Hereinafter describes a technical solution according to an embodiment of the present disclosure, taking an example in which the terminal is the execution subject. Reference is made to FIG. 9, which shows a schematic flowchart of a process of data interaction between device A and device B. Method 200 shown in FIG. 9 includes 201 to 206.

In 201, device B turns on a rear camera to capture an image of the surroundings, which is referred to as a first image, and construct a first three-dimensional space based on the first image.

In 202, device A turns on a front camera to capture an image including portrait A, which is referred to as a second image.

In 203, device A sends the second image to an RTC server.

In 204, the RTC server forwards the second image to device B.

In 205, device B performs image matting on the second image to obtain portrait A, which is referred to as a second portrait.

In 206, device B places portrait A in an AR space constructed by device B, that is, device B places the second portrait in the first three-dimensional space through augmented reality AR technology.

It should be noted that the second image may be acquired through other cameras. That is, the second image may be acquired by using a separate image acquisition device instead of device A, as long as the acquired second image contains a portrait.

In order to ensure that portrait A placed by device B in the AR space constructed by device B can have a face-to-face communication with portrait B, device A needs to transmit a height of portrait A, a distance from portrait A to the camera, together with the second image synchronously to device B.

As can be seen from the above embodiments, the method for image processing in the embodiments of the present disclosure can be used for a one-way image placement or two-way image placement. Taking FIG. 6 as an example, in a two-way transmission between end A and end B, same data processing is performed at each of the ends. Since end A and end B are located in different environments, spaces constructed through an SLAM algorithm are different.

A process of a one-way placement is described here. Device B processes the acquired image of surroundings through the SLAM algorithm to construct a space. Device A transmits the acquired image containing portrait A through the RTC server. Device B performs image matting to obtain portrait A and place portrait A in the AR space constructed by device B. That is, portrait A and portrait B are immersed in the AR space constructed by B, so that a virtual face-to-face communication between B and A is realized.

Application scenarios for the one-way placement may include cloud concerts, online education, live sales, and the like.

For example, in a cloud concert scene, an SLAM space of a concert venue may be constructed for each audience based on an image acquired by device B of the audience. An image including a portrait of a singer is transmitted from device A of the singer to device B through an RTC server. Device B performs image matting on the received image to obtain the portrait of the singer and place the portrait of the singer in the constructed SLAM space, for example, on a stage. Thereby, both the singer and the audience can experience a general atmosphere of a live concert, although the singer may actually stay in a studio, or the audience may actually stay at home. For each audience, a one-way placement is performed between device B held by the audience and device A of the singer.

In an online education scene, an SLAM space of a classroom or multi-function hall may be constructed for each student based on an image acquired by device B of the student. An image including a portrait of a teacher is transmitted from device A of the teacher to device B through an RTC server. Device B performs image matting on the received image to obtain the portrait of the teacher and place the portrait of the teacher in the constructed SLAM space, for example, on a platform. Thereby, both the teacher and the student can experience an atmosphere of face-to-face teaching, although both the teacher and the student may actually stay at home. For each student, a one-way placement is performed between device B held by the student and device A of the teacher.

In a live sales scene, an SLAM space of a goods-displaying scene or a scene where a customer is located may be constructed for each customer based on an image acquired by device B of the customer. An image including a portrait of an anchor is transmitted from device A of the anchor to device B through an RTC server. Device B performs image matting on the received image to obtain the portrait of the anchor and place the portrait of the anchor in the constructed SLAM space. For each customer, a one-way placement is performed between device B held by the customer and device A of the anchor.

In a two-way placement, device B processes the acquired image of surroundings through the SLAM algorithm to construct a first three-dimensional space. Device A transmits the acquired image containing portrait A through the RTC server. Device B performs image matting to obtain portrait A and place portrait A in the first AR space constructed by device B. That is, portrait A and portrait B are immersed in the first AR space constructed by device B, so that a virtual face-to-face communication between A and B is realized.

Simultaneously, device A processes the acquired image of surroundings through the SLAM algorithm to construct a second three-dimensional space. Device B transmits the acquired image containing portrait B through the RTC server. Device A performs image matting to obtain portrait B and place portrait B in the second AR space constructed by device A. That is, portrait A and portrait B are immersed in the second AR space constructed by device A, so that a virtual face-to-face communication between A and B is realized.

Application scenarios for the two-way placement may include video conference.

It should be understood that in the above example of the cloud concert scene, device B may construct a SLAM space of the concert venue based on an acquired image and transmit the SLAM space to a central server. The first image including the portrait of the singer is transmitted from device A of the singer to the central server through the RTC server. The central server performs image matting on the first image to obtain the portrait of the singer and place the portrait of the singer in the constructed SLAM space, such as the stage. In addition, a second image including a portrait of the audience may be transmitted from device A of the audience to the central server through the RTC server. The central server performs image matting on the second image to obtain the portrait of the audience and place the portrait of the audience in the constructed SLAM space, for example, on a seat of the audience. The central server then distributes an integrated image of both the portrait singer and the portrait of the audience to each user device.

Similar implementation may apply to the online education scenario, which is not described in detail for the sake of brevity.

Figure 10:
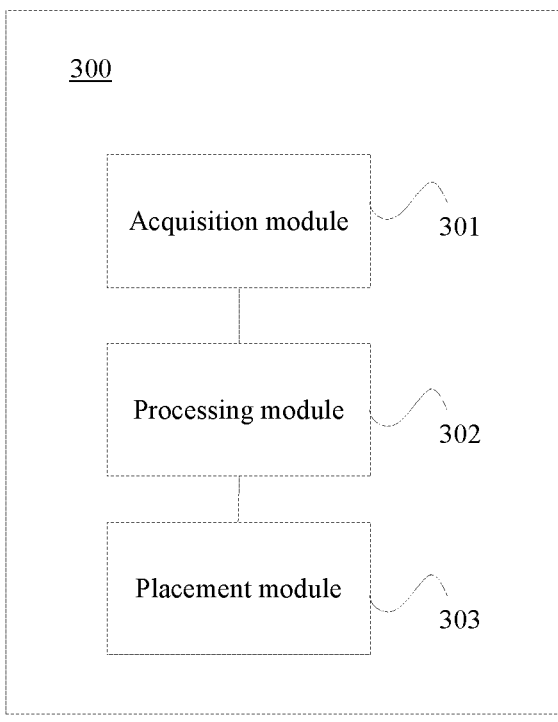
FIG. 10 is a schematic block diagram of a apparatus for image processing according to an exemplary embodiment of the present disclosure.

Based on the same inventive concept, a device 300 for image processing is further provided in the present disclosure. Reference is made to FIG. 10. The device 300 includes an acquisition module 301, a processing module 302, and a placement module 303.

The acquisition module 301 is configured to acquire a first image from a first terminal and a second image from a second terminal, where the first image includes a first portrait and the second image includes a second portrait.

The processing module 302 is configured to perform image matting on the second image to obtain the second portrait.

The placement module 303 is configured to place the second portrait in the first image through an augmented reality AR technology, to obtain a third image, where the third image is displayed on the first terminal.

Specific methods that the modules of the apparatus for image processing perform operations are described in detail in the method embodiments, and are not described in detail here.

Those skilled in the art should understand that functions of each module in the apparatus for image processing provided in the embodiments of the present disclosure may be understood with reference to the above relevant description of the method for image processing described. The functions of each module in the apparatus for image processing provided in the embodiments of the present disclosure may be implemented by using an analog circuit that realizes the functions described in the embodiments of the present disclosure, or by execution of software that performs the functions described in the embodiments of the present disclosure on the terminal.

Beneficial effects of the apparatus for image processing may be referred to description of the method for image processing, and are not repeated in order to simplify the description.

Reference is then made to FIG. 16, which is a schematic structural diagram of an electronic apparatus 400 (such as device A or device B in FIG. 10) suitable for implementing the embodiments of the present disclosure. The user device in the embodiments of the present disclosure may include, but is not limited to, a mobile terminal, such as a mobile phone, a notebook computer, a digital broadcast receiver, a PDA (Personal Digital Assistant), a PAD (Tablet computer), a PMP (Portable Multimedia Player), a vehicle-mounted terminal (such as an in-vehicle navigation terminal), and the like, and a fixed terminal such as a digital TV, a desktop computer, and the like. The electronic apparatus shown in FIG. 11 is only an example, and should not impose any limitation on the functions and applications of the embodiments of the present disclosure.

The electronic apparatus may include a memory and a processor. The processor may be referred to as a processing device 401 hereinafter. The memory may include at least one of a read only memory (ROM) 402, a random access memory (RAM) 403, and a storage device 408, which are described in detail below.

Figure 11:
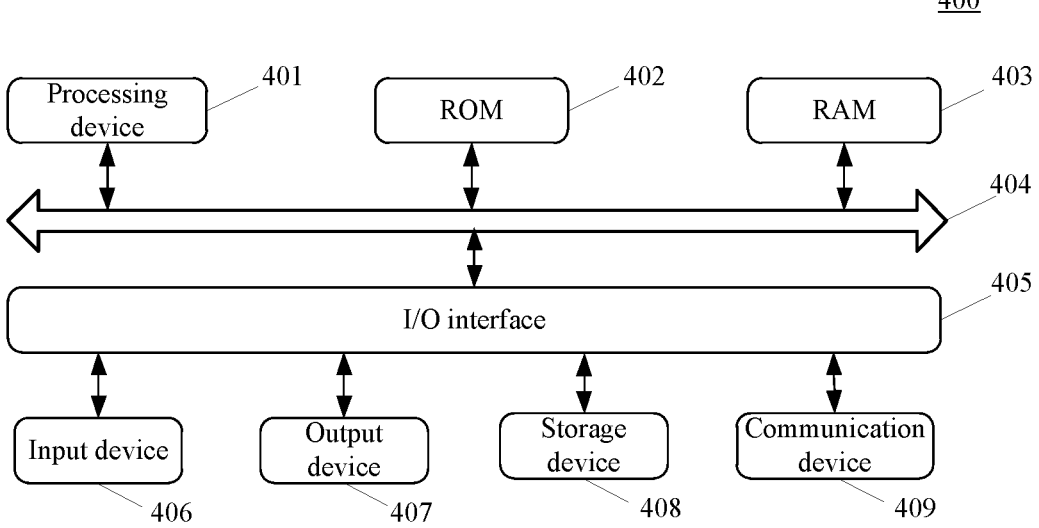
FIG. 11 shows a block diagram of an electronic apparatus according to an exemplary embodiment of the present disclosure.

As shown in FIG. 11, the electronic apparatus 400 may include a processing device (such as a central processing unit, and a graphics processor) 401 that may execute various appropriate actions and processes according to a program stored in a read only memory (ROM) 402 or loaded into random access memory (RAM) 403 from a storage device 408. Various programs and data necessary for the operation of the electronic apparatus 400 are also stored in the RAM 403. The processing device 401, the ROM 402, and the RAM 403 are connected to each other through a bus 404. An input/output (I/O) interface 405 is also connected to the bus 404.

Generally, the following devices may be connected to the I/O interface 405: an input device 406 such as a touch screen, a touchpad, a keyboard, a mouse, a camera, a microphone, an accelerometer, a gyroscope, and the like; an output device 407, such as a liquid crystal display (LCD), a speaker, a vibrator, and the like; a storage device 408, such as a magnetic tape, a hard disk, and the like; and a communication device 409. The communication device 409 may enable the electronic apparatus 400 to communicate in a wireless or wired manner with other devices to exchange data. Although FIG. 11 shows the electronic apparatus 400 having various devices, it should be understood that not all of the illustrated devices are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 409, or from the storage device 408, or from the ROM 402. When the computer program is executed by the processing device 401, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, device or components, or any combination thereof. More specific examples of computer readable storage media may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium may be any computer-readable medium other than a computer-readable storage medium that can transmit, propagate, or transport the program for use by or in connection with the instruction execution system, apparatus or device. Program code stored on a computer readable medium may be transmitted using any suitable medium, including, but not limited to, an electrical wire, an optical fiber cable, RF (radio frequency), or any suitable combination thereof.

The above-mentioned computer-readable medium may be included in the above-mentioned electronic apparatus, or may exist alone without being assembled into the electronic apparatus.

The above-mentioned computer-readable medium carries one or more programs. The one or more programs, when executed by the electronic apparatus, configure the electronic apparatus to: acquire a first image from a first terminal and a second image from a second terminal, where the first image includes a first portrait, and the second image includes a second portrait; perform image matting on the second image to obtain the second portrait; and place the second portrait in the first image through an augmented reality AR technology to obtain a third image, where the third image is displayed on the first terminal.

Computer program code for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to a user computer through any kind of network, including a local area network (LAN) or a wide area network (WAN), or may be connected to an external computer (e.g., using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in a reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform specified functions or operations, or may be implemented by a combination of dedicated hardware and computer instructions.

The units involved in the embodiments of the present disclosure may be implemented in a software manner, or in a hardware manner. The name of the unit or module does not constitute a limitation of the unit under any circumstances. For example, the acquisition module may be described as a module for acquiring a first image from a first terminal and a second image from a second terminal.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with an instruction execution system, device or apparatus. The machine-readable medium may be a machine-readable signal medium or a machine-readable storage medium. Machine-readable media may include, but are not limited to, electronic, magnetic, optical, electromagnetic, infrared, or semiconductor systems, devices, or apparatuses, or any suitable combination thereof. More specific examples of machine-readable storage media include electrical connections based on one or more wires, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, a device 300 for image processing, in [example 1], further includes a construction module 304 (not shown in drawings).

The construction module 304 is configured to construct a first three-dimensional space based on the acquired first image.

In this case, the placement module 303 is specifically configured to place the first second portrait in the first three-dimensional space through the augmented reality AR technology.

According to one or more embodiments of the present disclosure, a device 300 for image processing, in [Example 2], includes a construction module 301.

The construction module 301 is specifically configured to: process the first image by using a simultaneous localization and mapping SLAM algorithm, to construct the first three-dimensional space.

According to one or more embodiments of the present disclosure, a device 300 for image processing, in [Example 3], further includes a detection module 305 (not shown in the drawings).

The detection module 305 is configured to detect whether there is an office facility in the first three-dimensional space, and detect a posture of the second portrait.

The processing module 302 is further configured to: determine a position of the second portrait when the second portrait is placed in the first three-dimensional space, based on a position of a detected office facility and the posture of the second portrait.

In this case, the placement module 303 is specifically configured to place the second portrait at the position in the first three-dimensional space through the augmented reality AR technology.

According to one or more embodiments of the present disclosure, in a device 300 for image processing, in [Example 4], the processing module 302 is further configured to process the second portrait by using a holographic projection algorithm, to obtain a 3D image of the second portrait.

In this case, the placement module 303 is specifically configured to place the 3D image of the second portrait in the first three-dimensional space through the augmented reality AR technology.

According to one or more embodiments of the disclosure, in a device 300 for image processing in [Example 5], the acquisition module 301 is further configured to: acquire a first distance from the second portrait to a time of flight TOF camera of the second terminal, and a height of the second portrait.

The processing module 302 further configured to: determine, in a case that the first distance is not 0, a scaling ratio of the second portrait in the first three-dimensional space, based on the first distance, the height, and an acquired lens angle of a camera of the first terminal; and in a case that the first distance is 0, acquire a second distance from a position of the second portrait in the first three-dimensional space to the camera of the first terminal, and determine a scaling ratio of the second portrait in the first three-dimensional space based on the height, the second distance and the lens angle.

In this case, the placement module 303 is specifically configured to place the second portrait in the first three-dimensional space at the scaling ratio through the augmented reality AR technology.

According to one or more embodiments of the present disclosure, for a device 300 for image processing in [Example 6], in a case that the second image is captured through the TOF camera of the second terminal, the acquisition module 301 is specifically configured to: determine the height based on the first distance and the acquired lens angle of the TOF camera of the second terminal.

According to one or more embodiments of the present disclosure, for a device 300 for image processing in [Example 7], in a case that the second image is captured through a camera other than the TOF camera of the second terminal, the first distance is 0 and the height is equal to a preset value.

According to one or more embodiments of the present disclosure, in a device 300 for image processing in [Example 8], the processing module 302 is further configured to perform image matting on the first image to obtain the first portrait; and the placement module 303 is further configured to place the first portrait in the second image through the augmented reality AR technology, to obtain a fourth image, where the fourth image is displayed on the second terminal.

According to one or more embodiments of the present disclosure, in a device 300 for image processing in [Example 9], the construction module 304 is further configured to construct a second three-dimensional space based on the second image; and the placement module 303 is further configured to place the first portrait in the second three-dimensional space through the augmented reality AR technology.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover the technical solutions formed by any combination of the above-mentioned technical features or other equivalent features, without departing from the above disclosed concept. For example, a technical solution may be formed by replacing a feature with another feature having similar function disclosed in (but not limited to) the present disclosure.

Additionally, although operations are described in a particular order, this should not be construed as requiring that the operations to be performed in the particular order shown or in a sequential order. Under certain circumstances, multitasking and parallel processing may be advantageous. Similarly, although the above description contains several implementation details, these should not be construed as limitations on the scope of the present disclosure. Some features that are described in different embodiments may also be implemented in a same embodiment. Also, various features that are described in a single embodiment may be implemented in multiple embodiments separately or in any suitable sub-combination.

Although the subject matter has been described in language specific to structural features and/or logical acts, it is to be understood that the subject matter defined in the appended claims is not necessarily limited to the specific features or acts described above. Rather, the specific features and acts described above are merely examples for implementing the claims.

What is claimed is:

1. A method for image processing, comprising:
acquiring a first image from a first terminal and a second image from a second terminal, wherein the first image comprises a first portrait, and the second image comprises a second portrait;
performing image matting on the second image to obtain the second portrait;
acquiring a first distance from the second portrait to a time of flight TOF camera of the second terminal, and a height of the second portrait;
determining, in a case that the first distance is not 0, a scaling ratio of the second portrait in a first three-dimensional space, based on the first distance, the height, and an acquired lens angle of a camera of the first terminal;
in a case that the first distance is 0, acquiring a second distance from a position of the second portrait in the first three-dimensional space to the camera of the first terminal, and determining a scaling ratio of the second portrait in the first three-dimensional space based on the height, the second distance and the lens angle; and
placing the second portrait in the first image through an augmented reality AR technology to obtain a third image,
wherein the third image is displayed on the first terminal,
wherein placing the second portrait in the first image through the augmented reality AR technology comprises: placing the second portrait in the first three-dimensional space constructed based on the first image through the augmented reality AR technology, and
wherein placing the second portrait in the first three-dimensional space through the augmented reality AR technology comprises: placing the second portrait in the first three-dimensional space at the scaling ratio through the augmented reality AR technology.

2. The method according to claim 1, wherein
after acquiring the first image from the first terminal and the second image from the second terminal, the method further comprises:
constructing the first three-dimensional space based on the first image.

3. The method according to claim 2, wherein constructing the first three-dimensional space based on the first image comprises:
processing the first image by using a simultaneous localization and mapping SLAM algorithm, to construct the first three-dimensional space.

4. The method according to claim 2, wherein
before placing the second portrait in the first three-dimensional space through the augmented reality AR technology, the method further comprises:
detecting whether there is an office facility in the first three-dimensional space, and detecting a posture of the second portrait; and
determining the position of the second portrait when the second portrait is placed in the first three-dimensional space, based on a position of a detected office facility and the posture of the second portrait,
wherein placing the second portrait in the first three-dimensional space through the augmented reality AR technology comprises:
placing the second portrait at the position in the first three-dimensional space through the augmented reality AR technology.

5. The method according to claim 2, wherein
before placing the second portrait in the first three-dimensional space through the augmented reality AR technology, the method further comprises:
processing the second portrait by using a holographic projection algorithm, to obtain a 3D image of the second portrait,
wherein placing the second portrait in the first three-dimensional space through the augmented reality AR technology comprises:
placing the 3D image of the second portrait in the first three-dimensional space through the augmented reality AR technology.

6. The method according to claim 1, wherein in a case that the second image is captured through the TOF camera of the second terminal, acquiring the height of the second portrait comprises:
determining the height based on the first distance and an acquired lens angle of the TOF camera of the second terminal.

7. The method according to claim 1, wherein in a case that the second image is captured through a camera other than the TOF camera of the second terminal, the first distance is 0 and the height is equal to a preset value.

8. The method according to claim 1, further comprising:
performing image matting on the first image to obtain the first portrait; and
placing the first portrait in the second image through the augmented reality AR technology, to obtain a fourth image,
wherein the fourth image is displayed on the second terminal.

9. The method according to claim 8, wherein
after acquiring the first image from the first terminal and the second image from the second terminal, the method further comprises:
constructing a second three-dimensional space based on the second image; and
placing the first portrait in the second image through the augmented reality AR technology comprises: placing the first portrait in the second three-dimensional space through the augmented reality AR technology.

10. A apparatus for image processing, comprising:

at least one processor; and at least one memory communicatively coupled to the at least one processor and storing instructions that upon execution by the at least one processor cause the apparatus to:

acquire a first image from a first terminal and a second image from a second terminal, wherein the first image comprises a first portrait, and the second image comprises a second portrait;

perform image matting on the second image to obtain the second portrait;

acquire a first distance from the second portrait to a time of flight TOF camera of the second terminal, and a height of the second portrait;

determine, in a case that the first distance is not 0, a scaling ratio of the second portrait in a first three-dimensional space, based on the first distance, the height, and an acquired lens angle of a camera of the first terminal;

in a case that the first distance is 0, acquire a second distance from a position of the second portrait in the first three-dimensional space to the camera of the first terminal, and determine a scaling ratio of the second portrait in the first three-dimensional space based on the height, the second distance and the lens angle;

place the second portrait in the first image through an augmented reality AR technology to obtain a third image, wherein the third image is displayed on the first terminal;

place the second portrait in the first three-dimensional space constructed based on the first image through the augmented reality AR technology; and place the second portrait in the first three-dimensional space at the scaling ratio through the augmented reality AR technology.

11. The apparatus of claim 10, the at least one memory further storing instructions that upon execution by the at least one processor cause the apparatus to:

construct the first three-dimensional space based on the first image.

12. The apparatus of claim 11, the at least one memory further storing instructions that upon execution by the at least one processor cause the apparatus to:

process the first image by using a simultaneous localization and mapping SLAM algorithm, to construct the first three-dimensional space.

13. The apparatus of claim 11, the at least one memory further storing instructions that upon execution by the at least one processor cause the apparatus to:

detect whether there is an office facility in the first three-dimensional space, and detecting a posture of the second portrait; and determine the position of the second portrait when the second portrait is placed in the first three-dimensional space, based on a position of a detected office facility and the posture of the second portrait, wherein placing the second portrait in the first three-dimensional space through the augmented reality AR technology comprises:

place the second portrait at the position in the first three-dimensional space through the augmented reality AR technology.

14. The apparatus of claim 11, the at least one memory further storing instructions that upon execution by the at least one processor cause the apparatus to:

process the second portrait by using a holographic projection algorithm, to obtain a 3D image of the second portrait, wherein placing the second portrait in the first three-dimensional space through the augmented reality AR technology comprises:

place the 3D image of the second portrait in the first three-dimensional space through the augmented reality AR technology.

15. The apparatus of claim 10, the at least one memory further storing instructions that upon execution by the at least one processor cause the apparatus to:

determine the height based on the first distance and an acquired lens angle of the TOF camera of the second terminal.

16. The apparatus of claim 10, wherein in a case that the second image is captured through a camera other than the TOF camera of the second terminal, the first distance is 0 and the height is equal to a preset value.

17. The apparatus of claim 10, the at least one memory further storing instructions that upon execution by the at least one processor cause the apparatus to:

perform image matting on the first image to obtain the first portrait; and place the first portrait in the second image through the augmented reality AR technology, to obtain a fourth image, wherein the fourth image is displayed on the second terminal.

18. A computer-readable non-transitory medium, bearing computer-readable instructions that upon execution on a computing device cause the computing device at least to:

acquire a first image from a first terminal and a second image from a second terminal, wherein the first image comprises a first portrait, and the second image comprises a second portrait;

perform image matting on the second image to obtain the second portrait;

acquire a first distance from the second portrait to a time of flight TOF camera of the second terminal, and a height of the second portrait;

determine, in a case that the first distance is not 0, a scaling ratio of the second portrait in the first three-dimensional space, based on the first distance, the height, and an acquired lens angle of a camera of the first terminal;

in a case that the first distance is 0, acquire a second distance from a position of the second portrait in the first three-dimensional space to the camera of the first terminal, and determine a scaling ratio of the second portrait in the first three-dimensional space based on the height, the second distance and the lens angle;

place the second portrait in the first image through an augmented reality AR technology to obtain a third image, wherein the third image is displayed on the first terminal;

place the second portrait in the first three-dimensional space constructed based on the first image through the augmented reality AR technology; and place the second portrait in the first three-dimensional space at the scaling ratio through the augmented reality AR technology.

* * * * *